United States Patent [19]

Powell

[11] Patent Number: 4,887,549
[45] Date of Patent: Dec. 19, 1989

[54] DOG TRAINING APPARATUS

[75] Inventor: Mark A. Powell, Buda, Tex.

[73] Assignee: Texmark Enterprises, Inc., Manchaca, Tex.

[21] Appl. No.: 295,069

[22] Filed: Jan. 6, 1989

[51] Int. Cl.⁴ .............................................. A01K 15/00
[52] U.S. Cl. ...................................... 119/29; 119/106
[58] Field of Search .................. 119/29, 106; 128/421

[56] References Cited

U.S. PATENT DOCUMENTS

| | | | |
|---|---|---|---|
| 3,589,337 | 6/1971 | Doss | 119/29 |
| 3,753,421 | 8/1973 | Peck | 119/106 |
| 4,202,293 | 5/1980 | Gonda et al. | 119/29 |
| 4,210,150 | 7/1980 | James | 128/421 |
| 4,335,682 | 6/1982 | Gonda et al. | 119/29 |
| 4,539,937 | 9/1985 | Workman | 119/29 |
| 4,745,882 | 5/1988 | Yarnall, Sr. et al. | 119/29 |
| 4,794,402 | 12/1988 | Gonda etal. | 119/29 |
| 4,802,482 | 2/1989 | Gonda et al. | 119/29 |

Primary Examiner—Paul J. Hirsch
Attorney, Agent, or Firm—Cox & Smith Incorporated

[57] ABSTRACT

An apparatus for training dogs is disclosed which uses a non-painful electrical stimulus controlled by either a remote transmitter or the dog's own barking. The stimulus is a high voltage pulse of very short duration capable of producing a muscle spasm in the dog without also stimulating pain nerves. Because of the high voltage used, the electrodes do not have to directly contact the dog's skin which both lessens the chance of abrasive injury and makes the device especially suitable for long coated dogs.

8 Claims, 9 Drawing Sheets

DOG TRAINING APPARATUS

BACKGROUND OF THE INVENTION

In order to train a dog to stop barking or to stop any other undesirable behavior, the first step is to get the dog's attention. The most obvious way to do this is by means of a pain producing stimulus such as an electrical shock. Many devices have been developed in the past which perform this function automatically, using either a microphone to detect barking or a radio receiver to detect remotely transmitted commands, either of which then actuate the stimulus producing circuitry which is typically mounted on a dog collar. Such devices are disclosed in U.S. Pat. Nos. 3,589,337, 3,777,712, 4,202,293, and 4,335,682. All of these devices use an electrical shock to produce pain in order to teach the dog to avoid undesirable behavior. The theory of classical conditioning says that when a certain behavior is repeatedly paired with an unpleasant stimulus, the animal will learn to avoid that behavior even after the unpleasant stimulus is removed. The use of electrical shocks to produce pain for dog training, however, has been considered inhumane and fallen into disfavor.

In attempts to reduce the amount of painful shocking necessary to train a dog to avoid undesirable behaviors, electrical shocking devices have been modified to allow variable reduction of the voltage and current applied to the dog. Also, some devices have been modified to produce characteristic sounds which, after proper conditioning of the subject dog to be trained, are associated with the painful electrical shock by the dog. The sound stimulus can then be used alone to produce the desired alert response without the application of the painful electrical shock. Typical devices with the characteristic sound generating modifications are those shown in U.S. Pat. Nos. 4,202,293 and 4,335,682.

All of the prior art uses shock mechanisms which produce alternating current electricity, at frequencies from hundreds of hertz up to a few kilohertz and at voltages up to a few kilovolts rms, to produce the pain needed to get the dog's attention. The pain the dog experiences is produced by the rms current which produces stimulation of the dog's pain nerves by heating of the dog's tissues. Inappropriately applied, either automatically by detecting the repeated barking of a high strung, hyperactive dog responding to the shock with more barking, or by repeated manual actuation of a remote transmitter by an angry trainer, the heating of the dog's tissues by the resulting flow of current can be enough to actually produce tissue burning and injury to the dog. Some of these devices have been recalled by the Federal government due to the injury potential to both the dog and anyone handling the dog at the time the shock was applied, which has been the primary motivation for the aforementioned modifications to reduce the amount of painful electrical shock needed for training.

Another disadvantage of the prior art devices associated with their shocking systems is due to the voltage levels used. The lower the voltage, the shorter distance over which it will arc to shock the dog. All of the prior art devices have shocking contact points which must be touching the dog's skin in order to shock the dog. As such, the collars upon which all of the prior art devices are mounted must be fitted very tightly with long protruding electrodes so that the shocking contact points will make good contact with the dog's skin. On long haired dogs, proper fitting can be very difficult. Also, as a dog runs, the device will slip on the dog's neck, making and breaking electrical contact as well as abrading the dog's neck where the contact points touch the skin. This causes abrasive injury to the dog wearing the collar as well as rendering the device incapable of shocking the dog.

Another disadvantage of the prior art devices is that they all require special test equipment to allow the user to determine if they are indeed shocking properly, with no built in test equipment to indicate if shocking will occur when triggered properly.

Further disadvantages of the prior art devices are that they are susceptible to false triggering, reacting to sounds other than the barking of the dog wearing the bark activated device, or reacting to radio interference in the remotely controlled embodiments, and unjustly shock the dog. Further, in the bark activated embodiments, the dog's barking as a result of receiving shock produces more shocking which produces more barking, which may lead to injury. In the remote controlled embodiment, an angry trainer can easily abuse his dog by continuously transmitting the shock activating signals which cause the collar to continuously shock the dog, which may also cause injury. Also in the remotely controlled embodiments, they are electronically activated by contact plugs which may be lost, may corrode and not conduct, and/or may collect non-conductive dog dander, hair or body oils which render them non-conductive while on the dog.

It is an object of the present invention to provide an apparatus for dog training utilizing high voltage, low current, short duration pulses of current for stimulating the dog's nervous system but having insufficient energy to cause injury to the dog.

It is a still further object to provide a dog training apparatus mountable on a dog collar which imparts a limited number of shock pulses to the dog during a single triggering event with an automatic delay period which must elapse before another triggering event is effective to produce another set of shock pulses.

It is a further object to provide a dog training apparatus mountable on a dog collar which imparts shock pulses to the dog through electrodes which require neither contact with the dog's skin nor tight fit of the collar in order to eliminate the possibility of abrasive injury to the dog.

It is a further object to provide a dog training apparatus with a visible arc to allow the user to determine proper or improper operation without the use of special test equipment.

It is a further object to provide a dog training apparatus that in the remotely controlled version is activated by means of secure mechanism inherent in a detachable antenna.

It is a further object to provide a dog training apparatus that will minimize the possibility of false triggering. In either a bark activated embodiment, or a remotely controlled embodiment.

SUMMARY OF THE INVENTION

The present invention eliminates the problems of the prior art devices described above by using very short duration, very high voltage pulses which cannot produce rms currents capable of heating the dog's tissues to produce pain from the heat due to the necessarily low rms current produced by the short duration pulse.

Rather, the high voltage, low energy pulse stimulates the dog's nervous system to cause a spasm of the voluntary muscles which results in a subsequent temporary relaxation of those voluntary muscles. The high voltage pulses can produce pulse arcs of at least ⅜ inch which can penetrate not only through the thickest of dog coats, but actually follow non-conductive hair to the dog's skin. That eliminates the need for any tight or special fit of the collar for proper operation or long protruding contact points which can abrade a dog's neck while running. The high voltage used also allows the apparatus to be tested easily by the user when not on the dog as a visible spark is normally produced when the electrodes are actuated.

Because the pulse provides a stimulation to the nerves controlling the voluntary muscle system, the dog cannot ignore the startle effect of the involuntary spasm. Also, the relaxation effect on the voluntary muscles is especially beneficial at removing the stress on the high strung, hyperactive barker, which causes the barking in the first place. In accordance with the present invention, the number of direct current pulses the dog receives in a single corrective stimulus is limited, with a minimum automatic delay period between corrective stimuli, regardless of automatic or manual triggering of the device.

In one alternative embodiment, the stimulus producing circuitry of the apparatus is actuated by a microphone which detects the dog's own barking. In another alternative embodiment, the stimulus is produced in response to received radio signals from a remote transmitter.

DETAILED DESCRIPTION OF THE PREFERRED EMBODIMENT shown in FIGS. 1A-E, electrodes 30 are mounted on the package 60a. Because of the high voltages used, the electrodes may be flush with the surface of the collar and still be capable of producing the desired electrical stimulation. There is no need for the electrodes to directly touch the dog's skin and, therefore, no need for the electrodes to protrude in order to penetrate the dog s coat. This eliminates the possibility of abrasions caused by a very tight fitting collar with protruding electrodes rubbing against the dog's skin.

Figure 2A:
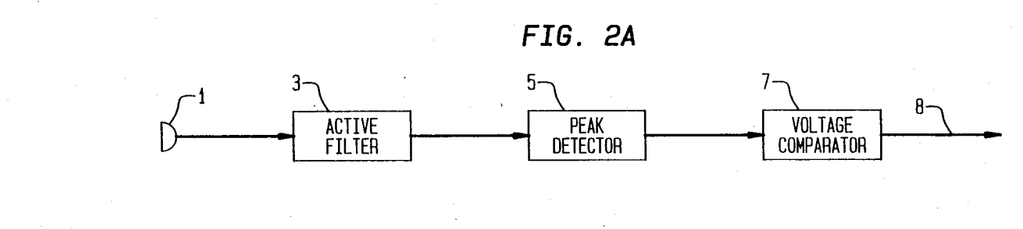
FIG. 2A is a block diagram of the bark detection circuit.
Figure 2B:
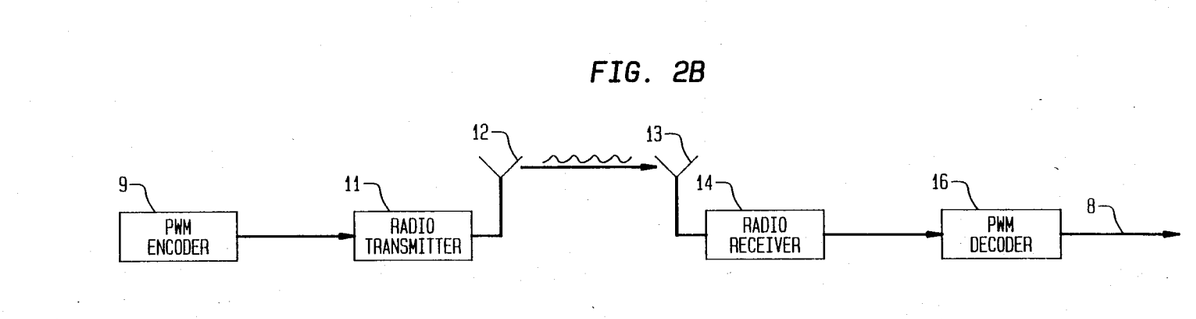
FIG. 2B is a block diagram of the radio transmission receiver circuit.
Figure 2C:
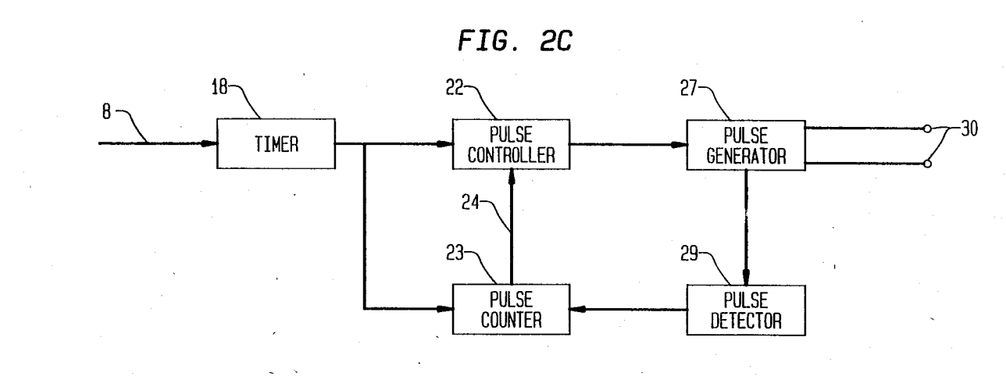
FIG. 2C is a block diagram of the pulse generation and control circuitry.

As is described more fully below, the electrodes 30 are connected to electronic circuitry within packages 60a and 60b. A low voltage power source 65 such as a 9 volt battery is also mounted within one of packages 60a or 60b to provide power to the electronic subsystems which control the operation of the electrodes. The electronic circuitry within packages 60a and 60b are electronically connected. FIGS. 2A-C are functional block diagram representations of those electronic subsystems. Specific hardware implementations of each functional block can take a wide variety of forms, all of which are well-known to those of ordinary skill in the art.

Figure 1A:
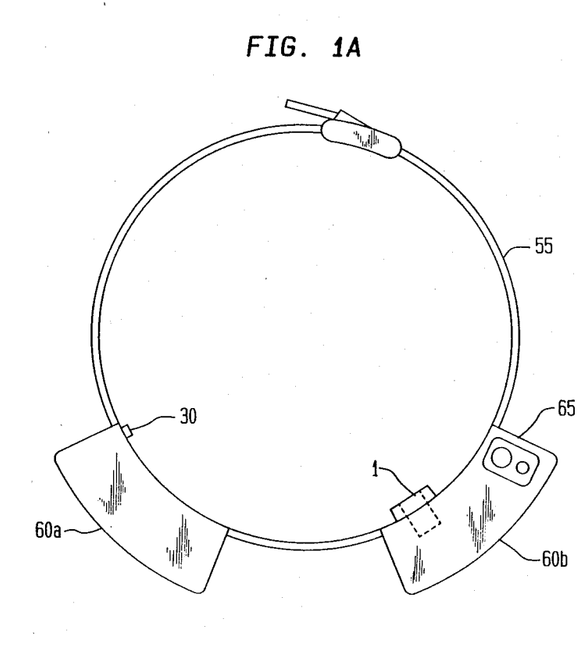
FIG. 1A is a top view of the bark activated embodiment of the present invention.
Figure 1B:
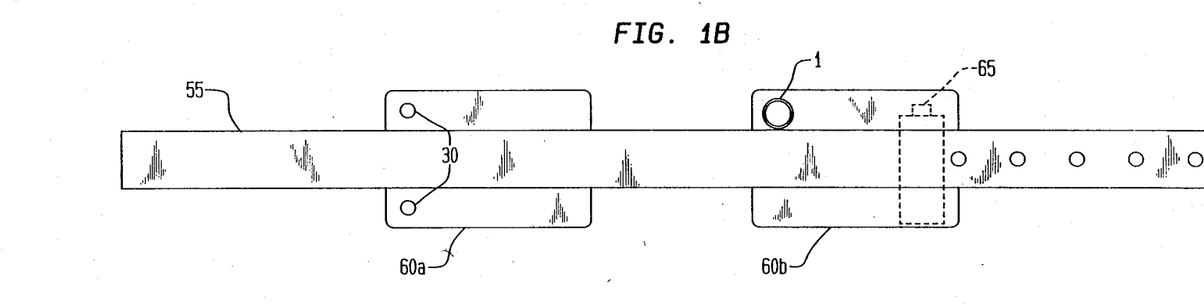
FIG. 1B shows the back side of the embodiment depicted in FIG. 1A.

In one embodiment of the present invention, the triggering event which causes an electrical shock pulse to be delivered to the dog is the dog's own barking. Referring to FIGS. 1A and 1B, microphone 1 is mounted at the bottom of package 60b. That arrangement symmetrically distributes the weight of the electronic circuitry on each side of the microphone 1 and serves to maintain the microphone 1 centered about the dog's throat. The position of the packages 60a and 60b is also stabilized away from the dog's legs.

Figure 1C:
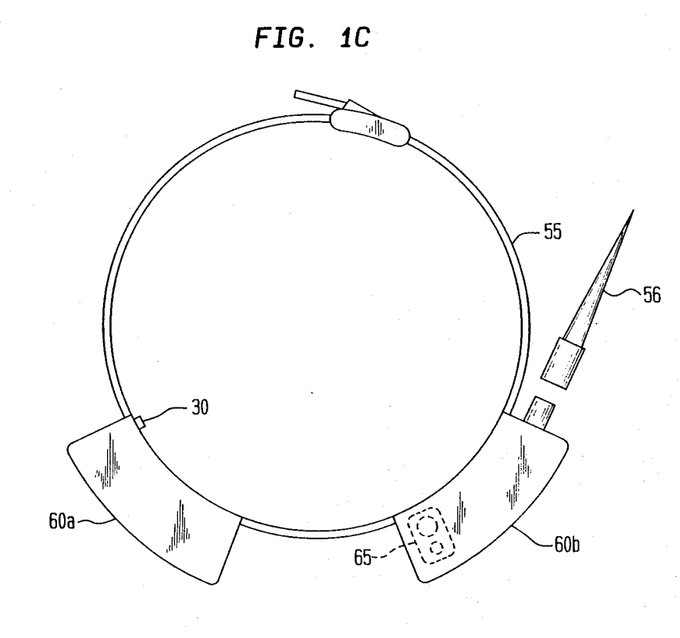
FIG. 1C is a top view of the remotely activated embodiment.
Figure 1D:
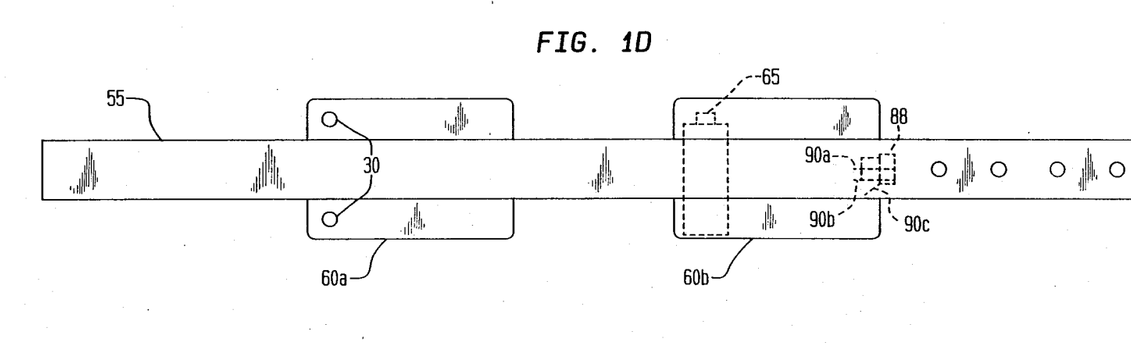
FIG. 1D shows the back of the embodiment depicted in FIG. 1C.
Figure 1E:
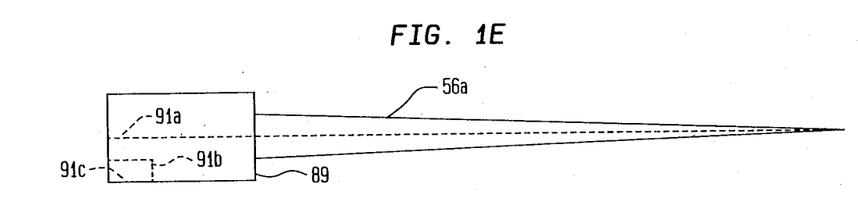
FIG. 1E shows the antenna used in the remotely activated embodiment.

FIGS. 1C and 1D show top and back views of the remotely activated embodiment of the present invention. Antenna 56 connects to one of the packages 60a and 60b so as to direct radio signals to a receiver 14. In a preferred embodiment of the present invention, the connection of antenna 56 also serves to connect power source 65 to the electronic circuitry within the packages 60a and 60b. When the antenna 56 is removed, the electronic circuitry is left in a powered down state. A connector 88 on package 60b for receiving the antenna 56 is a standard BNC triax bulkhead mounted female connector. The central conductor 90a is connected to the receiver 14. The middle conductor 90b and outside conductor 90c of connector 88 are connected to the ground wires for the electronic circuitry and power source 65, respectively, so that shorting conductors 90b and 90c powers up the circuitry. As shown in FIG. 1E, at one end of antenna 56 is a corresponding male BNC triax connector 89 with the central conductor 91a connected to the external antenna wire 56a. Inside the connector 89, the middle conductor 91b and outside conductor 91c are shorted together. Thus, insertion of the connector 89 into connector 88 connects the circuitry and power source grounds together to power up the electronic circuitry.

In FIG. 2A, the bark detection circuitry is shown as consisting of the microphone 1 which detects the sound of barking and produces an electrical signal which is amplified and filtered by an active filter 3. The filter 3 is a band pass filter which passes only those frequencies most prevalent in barking. In a presently preferred embodiment, the filter is designed to pass only those frequencies between 300 and 3500 Hertz. The amplified and filtered signal then enters the peak detector circuitry 5 which rectifies the signal and sets the peak as an exponentially decaying output with a time constant between two and seven seconds. This peak is compared to a voltage reference through a voltage comparator 7 and if above the reference voltage, a low output signal appears at line 8. Otherwise, the voltage comparator outputs a high signal.

FIG. 2B shows, as an alternative embodiment, radio signal transmission and detection circuitry which enables remote triggering of the device in response to a remotely transmitted radio signal. The preferred embodiment would use a pulse width modulation encoder 9 producing a train of coded pulses for modulating a radio signal (by frequency shift keying, for example) which is then transmitted by a radio transmitter 11 via antenna 12. This modulated radio signal is received on the antenna 13 on the collar and enters the radio receiver 14. The radio receiver strips the pulses off the carrier sending the stream of pulses to a pulse width decoder 16. The pulse width decoder 16 compares the pulse stream with a stored set of codes and sets the output of line 8 low if the comparison is positive. Otherwise, the pulse width decoder keeps the output line high. The use of encoded signals to trigger the device eliminates false corrections caused by interference from spurious radio transmissions.

FIG. 2C shows the pulse generation and control circuitry which produces a voltage pulse in response to signals received from either the bark detection circuit or the radio signal detection circuit. The actuating input in either case is a negative going pulse on line 8 which starts a non-retriggerable timer 18. Timer 18 then produces a pulse lasting between one and ten seconds. The output pulse from the timer 18 serves both as an initiating pulse to start the pulse controller 22 and a reset pulse to reset the pulse counter 23 to zero. The reset of the pulse counter also resets the pulse inhibit line 24 low. The pulse controller 22 starts the pulse generator 27 with a high signal on line 25. The pulse generator 27 produces very high voltage, very low rms amperage, very short duration pulses at the high voltage electrodes 30. These very high voltage, very low energy, very short duration pulses may range from 25,000 to 60,000 volts, with current less than 0.003 Amps rms, and for durations less than three microseconds (0.000003 seconds). Many equivalent designs for such a pulse generator are well-known in the art. One such pulse generator is found in U.S. Pat. No. 4,162,515, the disclosure of which is hereby incorporated by reference. These pulses are by the the pulse detector circuitry 29 which outputs a positive pulse whenever the pulse generator has produced a very high voltage pulse. The output of the pulse detector 29 enters the pulse counter 23 and triggers a count in the pulse counter circuitry. When that count exceeds some preset level, the pulse counter 23 produces a high output on the inhibit line 24 which goes into the pulse controller 22 and inhibits operation of the pulse generator 27. No further pulses can be produced by the pulse generator 27 until both the preset timing on the timer 18 has completed its cycle and another low signal is input to timer 18.

Figure 3:
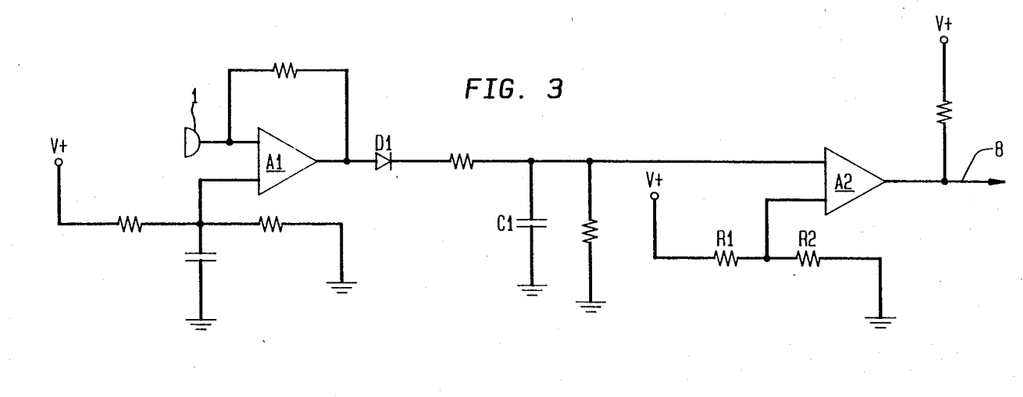
FIG. 3 shows an exemplary bark detection circuit.

A specific hardware implementation of the system described above will now be described although it should be realized that many equivalent implementations exist. With reference first to FIG. 3, there is shown a schematic of the bark pick-up circuitry in accordance with the block diagram representation of FIG. 2A. Responding to the dog's barking, microphone 1 produces a signal which is input to operational amplifier A1. Amplifier A1 is configured as an active filtering device which amplifies and passes only those frequencies between 300 and 3500 Hz, which are those most prevalent in a dog's bark. The amplified signal is then rectified by diode D1 and charges up capacitor C1. When the voltage across capacitor C1 exceeds a reference voltage produced by dropping the supply voltage across a voltage divider consisting of R1 and R2, comparator A2 outputs a low signal on line 8.

Figure 4:
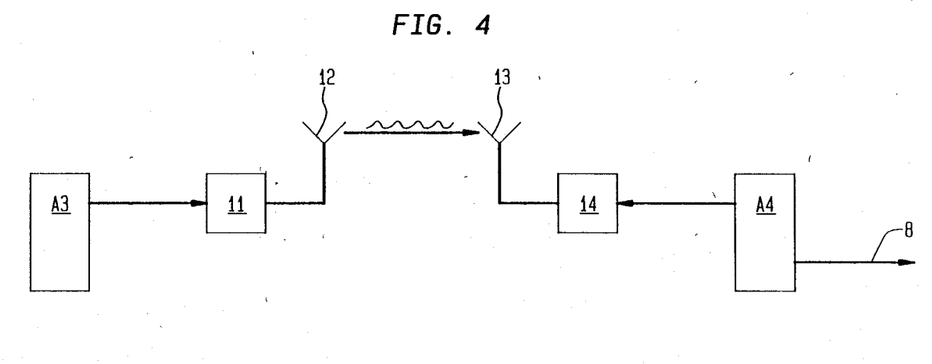
FIG. 4 shows an exemplary radio transmission and receiver circuit.

FIG. 4 shows a transmitter-receiver circuit with components corresponding to the functional block diagram of FIG. 2C. Upon application of power, pulse width modulation encoding chip A3 (an MC145026 manufactured by the Motorola Corp., for example) produces a train of coded pulses. Which are input to radio transmitter 11 which may be, for example, a Model 93727 manufactured by Airtronics, Inc., of Irvine, Calif. The result is a pulse-width modulated carrier signal which is transmitted to a receiver 14 on the collar 55 via antenna 56. The receiver 14 may be, for example, a Model 92237 also manufactured by the Airtronics Corp. After demodulation of the received carrier signal by receiver 14, a pulse train is sent to decoding chip A4 which could be, for example, a Motorola MC145028. Decoding chip A4 compares the pulse train with a stored code. If the input matches the stored code, a pulse is output to drive line 8 low.

Figure 5:
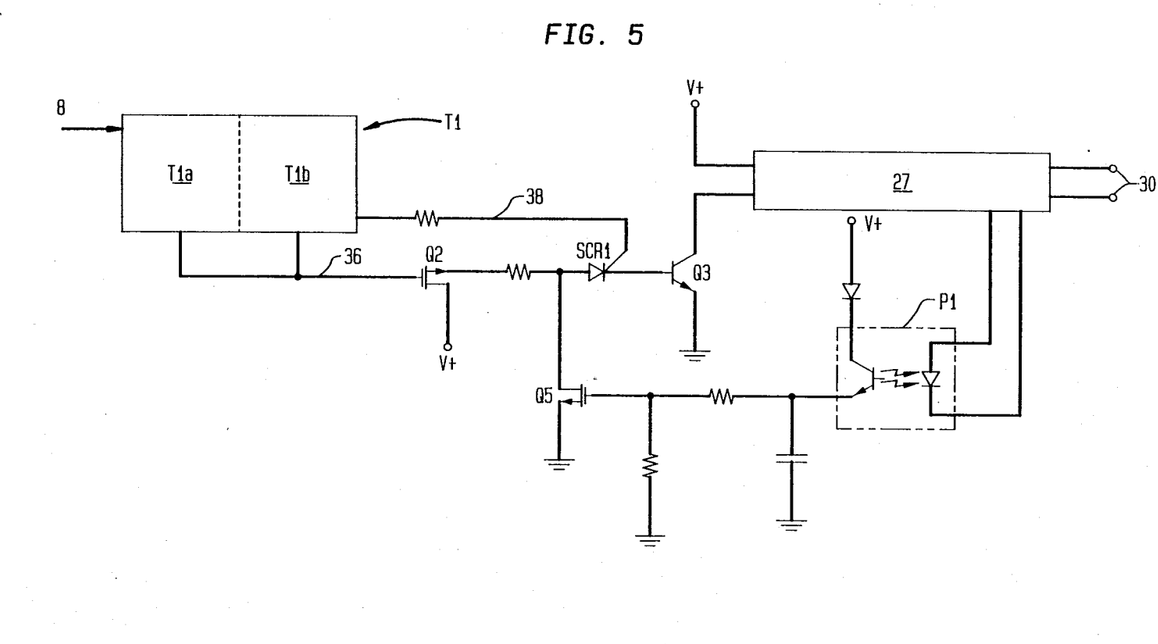
FIG. 5 shows an exemplary pulse generation and control circuit.

FIG. 5 shows the components of an exemplary pulse control and generation circuit in accordance with the functional block diagram of FIG. 2C. A pulse on line 8, from either comparator A2 or transistor Q1, depending on whether the device is actuated by remote control or the dog's bark, is fed to the trigger input of a timer T1, which in this example is a CD4538 dual timer chip having timers T1a and T1b. Line 8 triggers timer T1a which outputs a pulse on line 36 which lasts until the timer times out (preferably between 1.5 and 10 seconds). Timer T1a is operated in a non-retriggerable mode so that another pulse cannot be generated until the first pulse is completed. Thus, an automatic delay period is provided between corrective stimuli which can be adjusted by setting timer T1a to an appropriate time-out value. The output pulse of timer T1a triggers timer T1b which outputs a high signal on line 38 after a very short delay. The output of timer T1a is also connected to the gate input of FET transistor Q2. Thus, the output pulse also turns on FET transistor Q2 in order to supply current to silicon-controlled rectifier SCR1. The output at on line 38 of timer T1b is fed to the gate input of SCR1 which is supplied with holding current from transistor Q2, the latter device being turned on by the output pulse of timer T1a. SCR1 then supplies base current to transistor Q3 which is turned on to deliver the supply voltage to the pulse generation circuitry 27.

The voltage across the primary side of the transformer of the pulse generation circuitry 27 is also delivered to an optoisolator P1 (a PS2401A, for example). When the voltage spike across the electrodes 30 occurs, the output of optoisolator P1 goes high which turns on transistor Q5. Transistor Q5 when turned on draws sufficient holding current from silicon-controlled rectifier SCR1 to turn off that device which turns off transistor Q3, thus preventing any further pulses from reaching the dog. SCR1 will not conduct again until the output of timer T1b connected to the gate of SCR1 undergoes a low to high transition. Thus, timer T1a must time out and be retriggered by another pulse on line 8 and retrigger time T1b in order to turn on SCR1 again.

In this particular embodiment, only one pulse is allowed to be produced for each trigger input. In an alternative embodiment, a counter would be interposed between optoisolator P1 and transistor Q5. The counter would then turn on transistor Q5 only after receiving a selectable number of pulses from optoisolator P1. In this way, a variable number of shock pulses would be produced after each trigger signal.

Although the invention has been described in conjunction with the foregoing specific embodiment, many alternatives, variations and modifications are apparent to those of ordinary skill in the art. Those alternatives, variations and modifications are intended to fall within the scope and spirit of the appended claims.

I claim:

1. A dog training apparatus mounted on a dog collar, comprising:
   means for detecting a dog's bark and producing an electrical signal in response thereto;
   means responsive to the electrical signal from the bark detecting means for producing voltage pulses across a pair of electrodes in order to impart a shock to a dog;
   means for detecting the occurrence of a pulse across the electrodes;
   means for inhibiting the pulse producing means from producing further pulses for a predetermined automatic delay period after a pulse has been detected; and
   wherein the pulse detecting means counts the number of the pulses produced across the electrodes and the pulse inhibiting means prevents further pulses from being produced for a predetermined automatic delay period after the pulse count has reached a predetermined value and further wherein the pulse producing means produces pulses with a voltage between 25,000 and 60,000 volts for durations no more than three microseconds.

2. The apparatus of claim 1 wherein the bark detecting means comprises filtering means for passing audio frequencies between 300 and 3500 Hertz.

3. The apparatus of claim 1 further comprising a package mounted on each side of the collar for containing the apparatus and wherein the bark detecting means is a directional microphone mounted at the bottom of one of the packages which is maintained in a centered position about the dog's throat by the symmetrical weight distribution of the two packages.

4. A dog training apparatus mounted on a dog collar, comprising:
   means for detecting a remotely transmitted radio signal and producing an electrical signal in response thereto;
   means responsive to the electrical signal from the radio signal detecting means for producing voltage pulses across a pair of electrodes in order to impart a shock to a dog;
   means for detecting the occurrence of a pulse across the electrodes;
   means for inhibiting the pulse producing means from producing further pulses for a predetermined automatic delay period after a pulse has been detected; and
   wherein the pulse detecting means counts the number of the pulses produced across the electrodes and the pulse inhibiting means prevents further pulses from being produced for a predetermined automatic delay period after the pulse count has reached a predetermined value and further wherein the pulse producing means produces pulses with a voltage wherein 25,000 and 60,000 volts for durations no more than three microseconds.

5. The apparatus of claim 4 wherein the radio signal detecting means comprises a pulse-width demodulator.

6. The apparatus of claim 4 wherein the radio signal detecting means is a removable antenna and further comprising:
   a package mounted on the collar for containing the apparatus;
   a female connector mounted on the package for receiving the antenna and having conductors therein connected to a power source and a power ground for the apparatus, respectively;
   a male connector connected to the end of the antenna and having a conductor mounted thereon such that insertion of the male connector into the female connector electrically connects the conductors of the female connector which connects the power source to the power ground to power up the apparatus.

7. The apparatus of claim 6 wherein the female connector is of a triax type having a central conductor connected to the radio signal detecting means, a middle conductor and outside conductor connected to one of the other of the power source and power ground; and further wherein the male connector is of a triax type having a central conductor connected to the antenna wire with the middle and outside conductors shorted together.

8. The apparatus of claim 6 wherein the package containing the apparatus of a dual-package type with one package mounted on each side of the collar thereby symmetrically distributing the weight of the apparatus and maintaining the collar in a centered position without interfering with movement of the dog's legs.

* * * * *